(12) United States Patent
Guter et al.

(10) Patent No.: US 7,648,929 B2
(45) Date of Patent: Jan. 19, 2010

(54) LOW BORON GLASS COMPOSITION FOR LOOSE-FILL FIBERGLASS INSULATION

(75) Inventors: Ernest P. Guter, Newark, OH (US); Russell M. Potter, Hebron, OH (US); Michael E. Evans, Granville, OH (US)

(73) Assignee: Owens Corning Intellectual Capital, LLC DE (US)

( * ) Notice: Subject to any disclaimer, the term of this patent is extended or adjusted under 35 U.S.C. 154(b) by 369 days.

(21) Appl. No.: 11/026,983

(22) Filed: Dec. 30, 2004

(65) Prior Publication Data

US 2006/0148634 A1 Jul. 6, 2006

(51) Int. Cl.
C03C 13/00 (2006.01)
C03C 13/06 (2006.01)

(52) U.S. Cl. .............................. 501/36; 501/35; 428/171

(58) Field of Classification Search .................... 501/36, 501/37; 428/171
See application file for complete search history.

(56) References Cited

U.S. PATENT DOCUMENTS

| 2,974,052 | A |   | 3/1961 | Bacon et al. |       |
|-----------|---|---|--------|--------------|-------|
| 3,234,034 | A |   | 2/1966 | Jasinski et al. |    |
| 4,190,452 | A |   | 2/1980 | Fischer et al. |     |
| 4,542,106 | A |   | 9/1985 | Sproull      |       |
| 5,108,957 | A |   | 4/1992 | Cohen et al. |       |
| 5,932,499 | A |   | 8/1999 | Xu et al.    |       |
| 5,945,360 | A | * | 8/1999 | Harding et al. | 501/36 |
| 6,294,491 | B1| * | 9/2001 | Fay et al.   | 501/35 |

FOREIGN PATENT DOCUMENTS

| CN | 1450010 A | 10/2003 |
|----|-----------|---------|
| EP | 0 399 320 | 11/1990 |
| EP | 0 802 168 | 10/1997 |
| EP | 1 484 292 | 12/2004 |
| GB | 804451    | 11/1958 |
| JP | 56-109836 | 8/1981  |
| JP | 57-135743 | 8/1982  |
| JP | 61-270234 | 11/1986 |
| JP | 03-183638 | 8/1991  |
| SU | 1315401   | 6/1987  |
| WO | WO 2005/063643 | 7/2005 |

OTHER PUBLICATIONS

Volf, Milos B., "Chemical Approach to Glass", 1984, Elsevier Science Publishing Company, Inc., pp. 248-249.*
Scholze, Horst, "Glass: Nature, Structure, and Properties", 1991, Springer-Verlag, pp. 22-23.*
C. Langlais et al (1994) Influence of the Chemical Comp . . . .

* cited by examiner

Primary Examiner—Karl E Group
Assistant Examiner—Elizabeth A Bolden
(74) Attorney, Agent, or Firm—James J. Dottavio; Jason S. Fokens

(57) ABSTRACT

The present invention relates to fiberglass loose-fill insulation that is insensitive to the content of boron in the composition of the glass. It has been discovered that the level of boron in the glass used for the manufacture of loose-fill glass wool can be substantially reduced without degrading thermal performance. The lowered amount of boron provides for a lower cost batch composition and increased furnace life. The glass composition of the present invention includes a substantially reduced content of boron and preferably an increased amount of sodium dioxide. The primary phase of these glass compositions is typically devitrite ($Na_2Ca_3Si_6O_{16}$). The glass of the present invention provides a glass fiber blowing wool that does not require an increase in pack density to compensate for the reduced boron content while achieving the similar thermal conductivity. The glass of the present invention is also suitable for use in acoustic insulation.

10 Claims, 1 Drawing Sheet

LOW BORON GLASS COMPOSITION FOR LOOSE-FILL FIBERGLASS INSULATION

TECHNICAL FIELD AND INDUSTRIAL APPLICABILITY OF THE INVENTION

The present invention relates to glass compositions for the manufacture of fiberglass insulation and particularly to the manufacture of fiberglass insulation suitable for use as blowing wool.

BACKGROUND OF THE INVENTION

Thermal insulation formed of glass fibers is used in a multitude of applications. One process of manufacturing fiberglass insulation is a centrifugal process in which molten glass is emitted through the apertures of a rapidly rotating spinner. The glass is attenuated by contact with blasts of hot gases, such as steam or combustion gases. The attenuated fibers are typically sprayed with a binder, such as a phenol-formaldehyde, phenol-urea or polyacrylic acid binder. The fibers are then typically collected on a moving conveyor and dried and the binder, if any, is cured to form a pelt. The pelt may then be cut into strips and packaged as rolls or batts of insulation. Alternatively, loose-fill insulation or blowing wool may be made by cutting the fibers into small pieces to form cubes or nodules that are compacted and packaged for shipment.

Loose-fill fibrous insulation or blowing wool may be blown into a cavity between the framing members of a wall or it may be blown into the attic of a structure to form a layer of insulation that conforms to the structure and fills the cavity. The loose-fill insulation provides a low cost installation technique.

The insulation value, or "R-value", of insulation designates the resistance to the flow of thermal energy. The higher the R-value, the better the insulating properties of the subject materials. R-value is determined by the thickness (T) of the fibrous insulation and the insulation thermal conductivity (k) using equation 1.

$$R = T/k \qquad (1)$$

As can be derived from Equation 1 the R-value of an insulation is increased with increased thickness or with decreased k-value. The thermal conductivity is a measure of thermal conductivity of a particular material. Specifically, it is the measure of the amount of heat, in BTUs per hour, which will be transmitted through one square foot of material that is one inch thick to cause a temperature change of one degree Fahrenheit from one side of the material to the other. The SI unit for thermal conductivity is watts/meter/Kelvin. The lower the thermal conductivity for a material, the better it insulates. The thermal conductivity is dependent upon a number of variables including density, fiber diameter and glass composition. Increased pack density and reduced fiber diameter generally lead to lower thermal conductivities. In manufacturing a wool pack, the fiber diameter and pack density are controlled to yield the thermal conductivity required to give the necessary R-value at the specified product thickness.

Fiberglass insulation is manufactured from various raw materials combined in such proportions as to give the desired chemical composition. This proportion is termed the glass batch. This composition of the glass batch and the glass manufactured from it are commonly expressed in terms of percentages of the components expressed as oxides: typically $SiO_2$, $Al_2O_3$, CaO, MgO, $B_2O_3$, $Na_2O$, $K_2O$, $Fe_2O_3$, and minor amounts of other oxides. The glass composition controls the viscosity, liquidus temperature, durability, and biosolubility of the glass. Other important characteristics of the composition are raw material cost and environmental impact.

Glass wool manufacturers have designed their glass compositions to optimize the infrared radiation absorption or scattering of the glass wool and thus decrease the k-value of the glass wool and increase the R-value. In the article "Influence Of The Chemical Composition Of Glass On Heat Transfer Of Glass Fiber Insulations In Relation To Their Morphology And Temperature Of Use", C. Langlais et al., J. THERMAL INSUL. AND BLDG. ENVS., Vol 18, (1994), pp. 350-376, it was shown that wool pack thermal conductivity decreased with boron oxide addition to the glass up to about a $B_2O_3$ concentration of 6-7%. This phenomenon is termed the "Boron Oxide Effect."

U.S. Pat. No. 5,932,499 discusses the impact of boron on borosilicate glasses and discloses glass compositions including, in weight percent, 50-60% $SiO_2$, 2-6% $Al_2O_3$, 2-9% CaO, 1-7% MgO, 14-24% $B_2O_3$, 10-15% $Na_2O$, and 0-3% $K_2O$. In addition to these basic ingredients, the glasses may optionally contain from 0-4% $TiO_2$, 0-4% $ZrO_2$, 0-3% BaO, 0-4% ZnO, and 0-2% $F_2$. Other optional ingredients include transition metal oxides, especially $Fe_2O_3$, which can be added to increase the absorption and refractive characteristics of the glass in the near infrared (1-4 μm) range. However, near infrared absorption and refractive characteristics are not necessary for commercial building insulation. The '499 patent states that the composition dependent optical constants, for example, higher refractive and absorptive indexes, influence the blocking of radiation heat transfer. Prior art glasses PA-1, PA-2, PA-3 and PA-4 (shown in Table 1) are set forth in the '499 Patent and are said to absorb or scatter heat radiation more effectively than glasses with lower refractive and absorptive indexes in this range. Among other compositional changes described in the '499 patent, it is asserted the amount of $B_2O_3$ is increased to increase these optical constants. PA-5 is a general description of a typical high boron glass composition used in the industry.

TABLE 1

| EXAMPLE | PA-1 | PA-2 | PA-3 | PA-4 | PA-5 |
|---|---|---|---|---|---|
| $SiO_2$ | 57.0 | 55.2 | 58.1 | 52.8 | 48.63 |
| $Al_2O_3$ | 4.9 | 4.82 | 4.06 | 5.08 | 9.54 |
| CaO | 6.65 | 5.35 | 5.11 | 5.6 | 11.02 |
| MgO | 4.7 | 3.93 | 3.11 | 4.68 | 0.95 |
| $Na_2O$ | 17.14 | 11.7 | 14.7 | 10.8 | 4.85 |
| $K_2O$ | 1.1 | 1 | 0.91 | 0.9 | 0.57 |
| $B_2O_3$ | 8.5 | 18 | 14 | 20.1 | 23.90 |

Thus, prior art teaches that modification of the glass composition provides a third way, in addition to fiber diameter and pack density, to control the thermal conductivity of a wool pack: the thermal conductivity of the wool pack can be reduced by increasing the $B_2O_3$ of the glass fiber comprising the wool pack. Since the $B_2O_3$-containing raw materials are the most expensive components of the glass batch, increasing the $B_2O_3$ content increases the cost of the glass batch. This cost increase is offset by the pack density reduction made possible by the increase in $B_2O_3$. There thus exists an optimum $B_2O_3$ content which corresponds to that point at which these two competing effects yield a minimum overall production cost. For this reason, low-boron glasses are not typically used in the manufacture of wool insulation.

The specific chemistry used in generating the data for the High Boron (Pelt) and High Boron (Cubed) used in FIGS. 1 and 2 is set forth in TABLE 2.

TABLE 2

| Oxide | Wt. % |
|---|---|
| $SiO_2$ | 48.63 |
| $Al_2O_3$ | 9.54 |
| CaO | 11.02 |
| MgO | 0.95 |
| $B_2O_3$ | 23.90 |
| $Na_2O$ | 4.85 |
| $K_2O$ | 0.57 |
| $Fe_2O_3$ | 0.13 |
| $TiO_2$ | 0.04 |
| SrO | 0.37 |

Low Boron glasses for use as glass fiber reinforcements are disclosed in British Patent Specification No. 520,427 melt and form at higher temperatures, requiring operating conditions which could not be practically met. In addition, devitrification (crystallization) during fiber forming often occurred. For example, British Patent Specification No. 520, 247 discloses glass compositions that are substantially alkaline-free which contain CaO, MgO, $Al_2O_3$, and $SiO_2$, and that may be modified by the addition of $B_2O_3$, $CaF_2$, $P_2O_5$, or a small amount of an alkali such as $Na_2O$, $K_2O$, or $LiO_2$. However, these glasses are difficult to fiberize in a continuous fiber process at a forming temperature, at 2350 F. (1288 C.).

U.S. Pat. No. 4,542,106 to Sproull discloses boron- and fluorine-free glass fiber compositions for use in the manufacture of continuous strand processes rather than in rotary processes. In general, the glass compositions contain 58 to 60 percent $SiO_2$, 11 to 13 percent $Al_2O_3$, 21 to 23 percent CaO, 2 to 4 percent MgO, and 1 to 5 percent $TiO_2$. The glass fiber compositions may also contain alkali metal oxide and trace quantities of $Fe_2O_3$. The fibers disclosed by the '427 Patent and the '106 Patent are not used in insulation and thus the inventor is unconcerned with infrared radiation absorption or scattering and these factors, as well as R-value, are not measured.

To reduce the cost of manufacturing glass fibers for loose-fill insulation, and to reduce environmental impact without increasing production costs, there is a need in the art for improved glass compositions having low boron content.

SUMMARY OF THE INVENTION

The present invention relates to the surprising discovery that fiberglass loose-fill insulation is relatively insensitive to the content of boron in the composition of the glass. The level of boron in glass compositions can thus be substantially reduced without degrading the thermal performance of the loose-fill insulation. The lowered amount of boron provides for a less expensive batch composition and increases the life of the furnace used to melt the glass composition. The glass composition of the present invention includes a substantially reduced content of boron and preferably an increased amount of sodium dioxide. The primary phase of these glass compositions is typically devitrite ($Na_2Ca_3Si_6O_{16}$). The glass of the present invention provides a glass fiber blowing wool that does not require an increase in pack density to compensate for the reduced boron content while achieving the similar thermal conductivity. This is illustrated by FIGS. 1 and 2. FIG 1, which compares the thermal conductivities of pelts (batt insulation wool packs prepared from laboratory-produced insulation wool) from high and low boron glass wool shows the relation between high and low boron glass expected from the prior art. The high-boron pelt has a lower thermal conductivity at all pack densities. FIG. 2, which compares blown and hand-laid cubed insulation from high and low boron glass shows the unexpected result that the high-boron glass does not yield a lower thermal conductivity.

DETAILED DESCRIPTION AND PREFERRED EMBODIMENTS OF THE INVENTION

Figure 1:
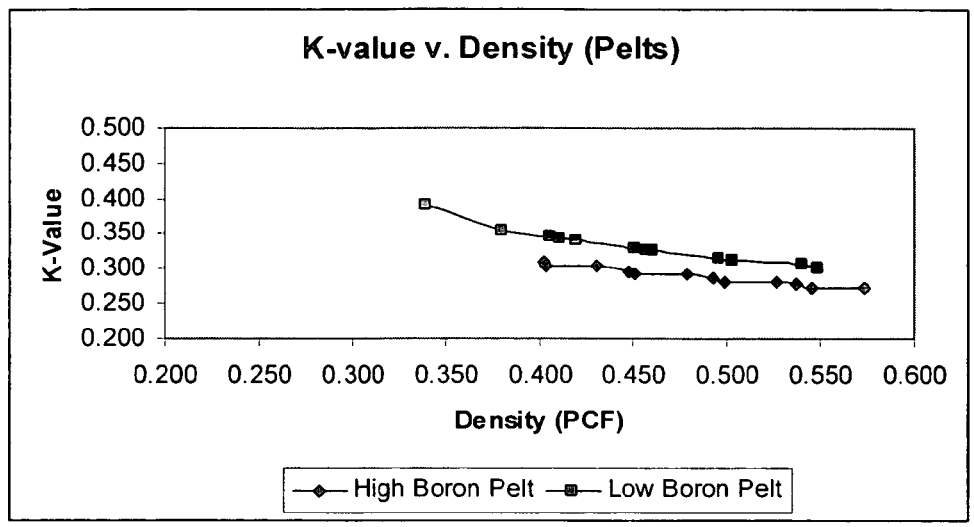
FIG. 1 is a graph of k-value verses density for pelts formed of the low boron glass chemistry according to one embodiment of the present invention and the prior art high boron glass chemistry.

The glass fiber compositions of the present invention have substantially lowered boron content in comparison to the glass fiber compositions of prior art fiberglass insulation. In general, fibers according to the invention may be prepared as follows. The batch materials, which may be obtained from suitable ingredients or raw materials such as sand for $SiO_2$, calcined lime for CaO, dolomite for MgO, and other components, are mixed or blended in a conventional manner in the appropriate quantities to give the desired weight percentages of the final composition. The mixed batch is then melted in a furnace, and the resulting molten glass is passed along a forehearth and into fiber formers such as spinners located along the bottom of the forehearth. The molten glass is typically forced through holes or orifices along the periphery to form individual streams of molten glass. The streams of molten glass flowing through the orifices are typically further attenuated by the impingement of heated air or other hot gasses. The fibers may be further processed in a conventional manner suitable for the production of loose-fill insulation.

Suitable glass compositions typically result in the formation of devitrite as the primary glass phase. The batch compositions typically include 66.7-71.8 percent by weight $SiO_2$, 0.3-1.6 percent by weight $Al_2O_3$, 1.2-8.0 percent by weight CaO, 0.1-3.3 percent by weight MgO, 17.4-23.6 percent by weight $Na_2O$, 1.1-2.6 $B_2O_3$ and various other oxide materials. The reduction in the amount of boron provides a substantial savings in the cost of the batch as compared to the higher boron batch compositions of the prior art.

Examples of various compositions of the present invention are set forth in TABLE 3. Each of these compositions were prepared, the liquidus and log 3 viscosity temperature (temperature at which the glass viscosity is $10^3$ poise) measured, and the delta-T calculated from the log 3 viscosity and the liquidus (log 3 viscosity—liquidus).

EXAMPLES

TABLE 3

| | EXAMPLE | | | |
|---|---|---|---|---|
| | PRIOR ART | EX-1 (WT. %) | EX-2 (WT. %) | EX-3 (WT. %) |
| $SiO_2$ | 66.18 | 66.70 | 68.4 | 68.55 |
| $Fe_2O_3$ | 0.496 | 0.30 | 0.30 | 0.174 |
| $TiO_2$ | 0.087 | 0.028 | 0.027 | 0.026 |
| $Al_2O_3$ | 1.91 | 1.60 | 1.20 | 1.32 |
| CaO | 9.12 | 8.00 | 6.70 | 6.63 |

TABLE 3-continued

| | EXAMPLE | | | |
|---|---|---|---|---|
| | PRIOR ART | EX-1 (WT. %) | EX-2 (WT. %) | EX-3 (WT. %) |
| SrO | 0.01 | 0.045 | 0.030 | 0.01 |
| MgO | 2.00 | 3.30 | 2.61 | 2.64 |
| $Na_2O$ | 14.70 | 17.39 | 19.18 | 19.15 |
| $K_2O$ | 0.94 | 0.357 | 0.270 | 0.35 |
| $B_2O_3$ | 4.51 | 2.10 | 1.100 | 1.14 |
| FeO | 0.133 | | | |
| $Cr_2O_3$ | 0.023 | 0.0048 | 0.0048 | |
| $SO_3$ | 0.130 | 0.15 | | |
| Log 3 Viscosity (F) | 1975 | 1976 | 1976 | 2012 |
| Liquidus (F) | 1772 | | | 1571 |
| Delta-T (F) | 203 | | | 441 |

The low-boron glass batch of Table 4 and the high-boron glass batch of Table 2 were melted in a furnace and fiberized in accordance with well-known procedures to form glass wool fibers suitable for use as insulation.

Devitrite ($Na_2Ca_3Si_6O_{16}$) is typically the primary phase of the glass compositions of the present invention. In prior art glasses the devitrite phrase has been avoided due to the higher amount of boron, and the primary phase is typically wollastonite or diopside. Devitrite crystallizes more rapidly than wollastonite or diopside, and this can lead to problems in fiber-forming. During the standard rotary fiber forming process operating with a glass whose delta-T is near 200 F, the temperature of the spinner typically falls below the glass liquidus for short periods of time. This has caused no problems with prior art glasses due to their low crystallization rates. With glass compositions of the present invention, however, the devitrite crystallizes rapidly enough that crystallization during such times can restrict or plug the orifices in the spinner and lead to poor fiber formation. Consequently, it is preferred to increase the delta-T of the glasses with devitrite as the primary phase in order for them to be formed satisfactorily in the current rotary process.

Figure 2:
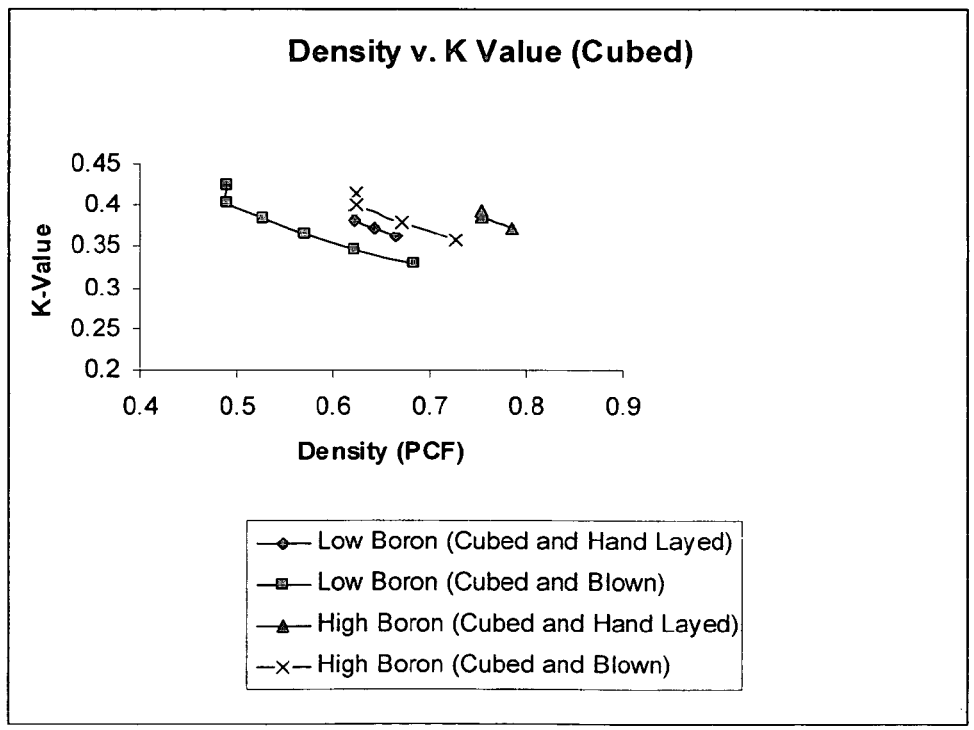
FIG. 2 is a graph of k-value verses density for layers of cubed insulation formed of the low boron glass chemistry according to one embodiment of the present invention and the prior art high boron glass chemistry.

Blankets of glass wool were manufactured using standard glass wool manufacturing methods to produce glass wool blankets. The specific chemistry used in to generate the data for the Low Boron (Pelt) and High Boron (Cubed) shown in FIGS. 1 and 2 is set forth in Table 4.

TABLE 4

| Oxide | Wt. % |
|---|---|
| $SiO_2$ | 71.79 |
| $Al_2O_3$ | 0.34 |
| CaO | 1.20 |
| MgO | 0.11 |
| $B_2O_3$ | 2.57 |
| $Na_2O$ | 23.64 |
| $K_2O$ | 0.11 |
| $Fe_2O_3$ | 0.15 |
| $TiO_2$ | 0.05 |
| SrO | 0.04 |

The glass wool pelts were manufactured to produce low boron pelts of the present invention (according to the composition of TABLE 4) and high boron pelts of the prior art (according to the composition of TABLE 2). The k-value of the pelts at various densities was measured and the data is set forth in TABLE 5. As can be seen from FIG. 1, the measured k-values of the high boron pelt is lower than the measured k-values of the low boron pelt, demonstrating the "Boron Oxide Effect" as described by C. Langlais et al.

TABLE 5

| Low Boron (Pelt) | | High Boron (Pelt) | |
|---|---|---|---|
| Density (PCF) | K Value | Density (PCF) | K Value |
| 0.340 | 0.392 | 0.403 | 0.310 |
| 0.380 | 0.355 | 0.404 | 0.305 |
| 0.405 | 0.345 | 0.430 | 0.304 |
| 0.412 | 0.342 | 0.447 | 0.297 |
| 0.420 | 0.339 | 0.451 | 0.292 |
| 0.451 | 0.329 | 0.478 | 0.292 |
| 0.457 | 0.326 | 0.492 | 0.286 |
| 0.460 | 0.326 | 0.499 | 0.281 |
| 0.496 | 0.316 | 0.526 | 0.282 |
| 0.503 | 0.313 | 0.537 | 0.278 |
| 0.541 | 0.305 | 0.546 | 0.273 |
| 0.549 | 0.302 | 0.574 | 0.274 |

Glass wool pelts were cubed and hand placed or blown using a blowing wool machine and the densities and k-values were measured and recorded. The data is set forth in TABLE 6. As can be seen from FIG. 2 the low boron glass wool that was cubed demonstrated a k-values which were lower than the k-values of the cubed high boron glass wool.

TABLE 6

| Low Boron (Cubed) | | | | High Boron (Cubed) | | | |
|---|---|---|---|---|---|---|---|
| Hand Placed | | Blown | | Hand Placed | | Blown | |
| Density (PCF) | K Value | Density (PCF) | K Value | Density (PCF) | K Value | Density (PCF) | K Value |
| 0.602 | 0.393 | 0.456 | 0.425 | 0.738 | 0.394 | 0.582 | 0.415 |
| 0.622 | 0.381 | 0.489 | 0.404 | 0.755 | 0.386 | 0.624 | 0.400 |
| 0.643 | 0.372 | 0.526 | 0.385 | 0.785 | 0.372 | 0.672 | 0.379 |
| 0.667 | 0.363 | 0.570 | 0.365 | | | 0.728 | 0.359 |
| | | 0.622 | 0.347 | | | | |
| | | 0.684 | 0.329 | | | | |

The finding that the low boron compositions of the present invention provide glass wool blowing wool which is at least equal in k-value to that of high boron compositions is surprising. Based on the compositions of the present invention, it is possible to lower the batch cost for the production of such blowing wool.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

The glass compositions of the present invention are also particularly applicable to acoustic applications since these glasses would be expected to yield acoustic insulation performance equivalent to prior art glasses but at a lower cost. Batts or blankets of acoustic insulation are typically used in the interior of a structure where R-value is not a consideration. Thus it is possible to use batts or blankets of glass wool for acoustic insulation to take advantage of the low material cost without any detriment to the desired acoustic properties sine the "low Boron Effect" relates only to thermal properties of glass wool.

We claim:

1. A glass fiber insulation blowing wool formed from a glass batch comprising, in weight percent:

| | |
|---|---|
| $SiO_2$ | 66.7-71.8 |
| $Al_2O_3$ | 0.3-1.6 |
| CaO | 1.2-8.0 |
| MgO | 0.1-3.3 |
| $Na_2O$ | 17.4-23.6 |
| $B_2O_3$ | 1.1-2.6 | wherein the glass batch forms a devitrite phase when melted and formed into fibers.

2. The glass fiber insulation of claim 1, wherein the glass batch comprises additional oxides selected from the group consisting of potassium, iron, titanium and strontium oxides.

3. The glass fiber insulation of claim 2, wherein the glass batch comprises between about 1.1 and 2.1 wt. % $B_2O_3$.

4. The glass fiber insulation of claim 2, wherein the glass batch forms a glass having a delta-T of at least 300° F. when melted.

5. The glass fiber insulation of claim 2, wherein the glass batch forms a glass having a liquidus less than about 1700° F. when melted.

6. The glass fiber insulation of claim 2, wherein the glass batch forms a glass having a log 3 viscosity of at least about 1800° F. when melted.

7. A glass insulation wool, comprising: devitrite as a primary phase, where in the wool is formed from a batch composition comprising in weight percent:

| | |
|---|---|
| $SiO_2$ | 66.70-71.79 |
| $Al_2O_3$ | 0.34-1.60 |
| CaO | 1.2-8.00 |
| MgO | 0.11-3.30 |
| $Na_2O$ | 17.4-23.64 |
| $B_2O_3$ | 1.100-2.60. |

8. The glass insulation wool of claim 7, wherein the wool is formed from a batch composition that forms a glass having a delta-T of at least 300° F. when melted.

9. The glass insulation wool of claim 7, wherein the wool is formed from a batch composition that forms a glass having a liquidus of at least about 1700° F. when melted.

10. The glass insulation wool of claim 7, wherein the wool is formed from a batch composition that forms a glass having a log 3 viscosity of at least about 1800° F. when melted.

* * * * *